A. PEASE.
DRILL FOR METAL DRILLING.
No. 10,744.  Patented Apr. 4, 1854.
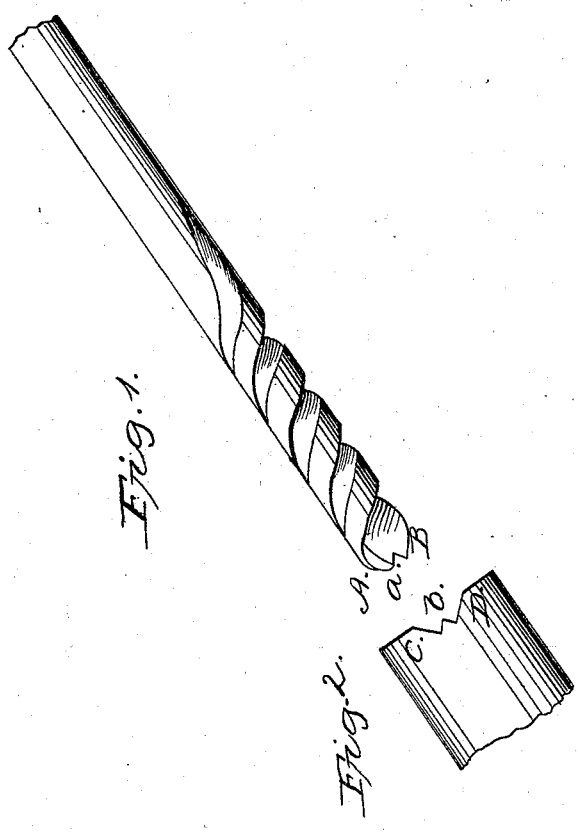

UNITED STATES PATENT OFFICE.

ABIEL PEASE, OF ENFIELD, CONNECTICUT.

DRILL FOR METAL GUN-BARRELS.

Specification of Letters Patent No. 10,744, dated April 4, 1854.

*To all whom it may concern:*

Be it known that I, ABIEL PEASE, of the town of Enfield, in the county of Hartford and State of Connecticut, have invented a new and useful Improvement in the Construction of Drills for Drilling Steel or Iron Gun-Barrels; and I do hereby declare that the following is a full, clear, and exact description of the construction and operation of the same, reference being had to the accompanying drawings, which make a part of this specification, in which—

Figure 1 is a perspective view of the drill, showing the form of the cutting end. Fig. 2, is a view of a section of the barrel being drilled, showing the form of the bottom of the hole at all times while drilling.

My improvement consists in making the end of the drill in such a form as to combine the advantages of both the male and female center, to keep the point of the drill in the center of the bar being drilled, through the whole length; the bar being revolved in the lathe with suitable velocity, so as to save the trouble and inconveniences arising from the drill running out of the center, as it does when drilled in the common way, by the common drill.

I make the drill of cast steel, or other suitable material, twisted, as seen in Fig. 1, or otherwise, to cause it to clear itself; with two cutting lips, A, and B, Fig. 1, of the ordinary shape of the male center drill, until they approach near the center. I then cut down, with a sharp edged file, or otherwise, directly in the center, a slot, or notch, as represented at *a*, Fig. 1, (forming two more cutting edges,) so that the drill will cut the shape at the bottom of the hole which is represented in Fig. 2, so the projection, *b*, Fig. 2, in the center of the bottom of the hole, as a male center, will constantly fit into the slot, or notch, *a*, Fig. 1, and the two lips A, and B, Fig. 1, as a male center, fit into the female center, C, D, Fig. 2, so as to afford all the advantages of both male and female centers, in both the drill and the hole, to guide the drill throughout, the whole length of the bar being drilled, and thereby prevent the drill from running toward the side of the bar, in any case.

The advantages of my improvement consist in so constructing the drill, by means of both the male and female centers combined, as to both press and draw the drill continually toward the center of the bar during the whole operation.

I am aware that drills have been used with a hole in the center extending lengthwise of the drill but such I do not claim; but

What I claim as my invention and desire to secure by Letters Patent is,

Constructing a drill for drilling metals with a notch (*a*) with two cutting edges, which leave a guiding cone in the center of the hole as it is bored, which is cut down as the drill advances; in combination with the beveled edges of the lips A, B, substantially as herein specified and for the purposes set forth.

ABIEL PEASE

Witnesses:
   E. STOCKWELL,
   R. FITZGERALD.